(12) United States Patent
Hashimoto

(10) Patent No.: US 6,567,123 B1
(45) Date of Patent: May 20, 2003

(54) ELECTRONIC CAMERA

(75) Inventor: Hitoshi Hashimoto, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/168,294

(22) Filed: Oct. 8, 1998

(30) Foreign Application Priority Data

Oct. 8, 1997 (JP) .............................................. 9-290548

(51) Int. Cl.$^7$ ........................... H04N 5/235; H04N 9/73
(52) U.S. Cl. .............................. 348/229.1; 348/230.1; 348/223.1
(58) Field of Search ................................. 348/229, 230, 348/223, 226, 241, 370, 229.1, 230.1, 223.1, 226.1

(56) References Cited

U.S. PATENT DOCUMENTS

| | | | | |
|---|---|---|---|---|
| 5,293,238 A | * | 3/1994 | Nakano et al. | 348/229 |
| 5,526,046 A | * | 6/1996 | Kondo | 348/220 |
| 5,585,844 A | * | 12/1996 | Hieda et al. | 348/229 |
| 5,883,666 A | * | 3/1999 | Kyuma et al. | 348/229 |
| 5,999,215 A | * | 12/1999 | Tamura | 348/224 |
| 6,137,533 A | * | 10/2000 | Azim | 348/222 |
| 6,373,524 B2 | * | 4/2002 | Sua et al. | 348/345 |

* cited by examiner

*Primary Examiner*—Wendy R. Garber
*Assistant Examiner*—Lin Ye
(74) *Attorney, Agent, or Firm*—Pillsbury Winthrop LLP

(57) ABSTRACT

An electronic camera is disclosed, which comprises a CCD image pick-up device 3, a CCD driver 19 for setting the photoelectric charge accumulation time of the CCD image pick-up device, an image pick-up circuit 4 including gain control means, for processing a signal from the CCD image pick-up device to obtain an image signal, and CPU 17 for sequentially executing an AE, an AF and an AWB process according to an AE, an AF and an AWB evaluation values obtained by using the image signal. The gain of the image signal is updated by adding ⅓ of the change in a gain setting value obtained in the AE process executed by the CPU for each frame. The image brightness is thus varied smoothly to provide movie images not giving any sense of uncomfortability.

9 Claims, 14 Drawing Sheets

ELECTRONIC CAMERA

BACKGROUND OF THE INVENTION

The present invention relates to electronic cameras having high pixel density image pick-up devices and, more particularly, to electronic cameras which can provide smooth moving images to a liquid crystal display for recorded image confirmation with contracted evaluation value computing circuit for AE (automatic exposure), AF (auto focus) and AWB (auto white balance).

Electronic cameras generally called digital cameras or cam coders have an AE, an AF and an AWB function. For intelligently carrying out the processes of executing these functions, a method of control, in which evaluation values are obtained by dividing the image area into a plurality of divisions, is well known in the art. An exemplified construction of the electronic camera, in which the AE, AF and AWB are controlled by dividing the image area into a plurality of division areas, will now be described with reference to the block diagram shown in FIG. 1. An image is focused through a lens system 1 including a focus adjusting lens and an iris 2 for light dose adjustment on a CCD image pick-up device 3. The CCD image pick-up device 3 photoelectrically converts the focused image into an electric signal. A photographing circuit 4 processes the electric signal to generate an image signal. An A/D converter 5 converts the image signal to a digital signal.

When a CPU 17 detects that a recording mode has been set up by a mode setting switch 18, it controls the entire camera for operation in the recording mode. The digital signal from the A/D converter 5 is tentatively accumulated in a buffer 6, and then converted in a D/A converter to an analog signal, which is provided to a liquid crystal display (LCD) 9. The user can utilize the liquid crystal display as a view finder for setting the image to be picked up by watching the image displayed on the liquid crystal display 9. A compressor/decompressor 8 compresses the digital signal accumulated in the buffer 6 for recording the compressed digital signal as image data in a recording memory 10. When the CPU 17 detects that a play mode has been set up by the mode setting switch 18, it controls the entire camera for operation in the play mode. In this camera, the compressor/decompressor 8 decompresses the image data stored in the recording memory 10, and the expanded image data is tentatively accumulated in the buffer 6. The D/A converter 7 then converts the accumulated digital data to analog data, which is provided to the liquid crystal display 9. The user thus can confirm the recorded image by watching the image displayed on the liquid crystal display 9. The digital image signal from the A/D converter 5 is also provided to an AE, an AF and an AWB data detector 11, 12 and 13, respectively. The AE data detector 11 extracts a low frequency component of the image signal. A 1-st area integrator 14a integrates the extracted low frequency component for each of a plurality of divisions of the image area by using either an evaluation value memory 15a or 15b. Each integration value is preserved directly as AE evaluation value in the evaluation value memory 15a and 15b.

Now, area integration executed by accessing the two evaluation value memories 15a and 15b will now be described with reference to the timing chart shown in FIG. 2. Data A which is obtained by exposure in a 1-st VD (vertical sync signal) period, is integrated in a 2-nd VD cycle in the 1-st area integrator 14a. When the 1-st area integrator 14a makes the memory accessing, it always makes memory accessing, and exclusively uses one evaluation value memory. Meanwhile, the CPU 17 seeks to read the result of area integration result of data A (i.e., evaluation result A') from the evaluation value memory in a certain part of a 3-rd VD cycle. In this period, however, the 1-st area integrator 14a also seeks to make area integration of data B obtained by exposure in the 2-nd VD cycle by using the evaluation value memory. This means that it is inconvenient if only a single evaluation value memory is provided. Where two evaluation value memories are provided, one of them can be used for the area integration, while using the other for reading out the result of area integration (i.e., evaluation value). By alternately using these two evaluation value memories, it is possible to obtain the evaluation value for each VD (frame) period. For this reason, two evaluation value memories are provided for each of the 1-st to 3-rd area integrators 14a to 14c.

Referring to the timing chart of FIG. 2, in the 2-nd VD cycle the 1-st area integrator 14a executes area integration of data A by using the evaluation value memory 15a, in the 3-rd VD cycle the CPU 17 reads out the result of area integration of data A, i.e., evaluation value A', from the evaluation value memory 15a while the 1-st area integrator 14a makes area integration of data B by using the evaluation value memory 15b, and in the 4-th VD cycle the CPU 17 reads out evaluation value B' of data B from the evaluation value memory 15b while the 1-st area integrator 14a executes area integration of data C by using the evaluation data memory 15a.

Referring back to the block diagram of FIG. 1, the AFD data detector 12 extracts a high frequency component of the image signal. A 2-nd area integrator 14b integrates the extracted high frequency component for each of the plurality of image area divisions by using either an evaluation value memory 15c or 15d. The result of the area integration is directly stored as AF evaluation value in either of the evaluation value memories 15c or 15d. The AWB data detector 13 separates color components (for instance R, G and B components) from the image signal. A 3-rd area integrator 14c integrates each separated color signal for each of the plurality of image area divisions by using either an evaluation value memory 15e or 15f. The result of the area integration is directly stored as AWB evaluation value in either of the evaluation value memories 15e and 15e. The CPU 17 can obtain the AE, AF and AWB values through the multiplexer 16. Since it is possible time-wise to read the three, i.e., AE, AF and AWB, evaluation values in one VD cycle, the CPU 17 can take out a desired evaluation value at a desired timing. Of curse, the CPU 17 can take the three evaluation values for each VD frame.

The CPU 17 controls the gain of the image signal from the image pick-up circuit 4 according to the AF evaluation value. Also, the CPU 17 controls the shutter speed of a device shutter in a CCD driver 19. (By the term "device shutter" is meant what can provide an equivalent effect to opening and closing a mechanical shutter by varying the photoelectric charge storage time of the image pick-up device.) The CPU 17 further drives the iris 2, which is coupled to a motor 22, via a motor driver 20 for exposure setting. The CPU 17 further drives a focusing lens, which is coupled to a motor 23, via a motor driver 2 according to the AF evaluation value. The CPU 17 further controls the gain of the image signal from the image pick-up device 4 for each color according to the AWB evaluation value, for white balance setting.

As shown above, the electronic camera having the construction as shown in FIG. 1, can execute intelligent AE, AF and AWF processes. On the demerit side, however, the camera requires three area integrators and six memories therefor, thus leading to an extremely large circuit scale. FIG. 3 shows a different example of the electronic camera construction, which uses a common area integrator and common evaluation value memories for decreasing circuit scale. A different part of the electronic camera shown in FIG. 3 from the one shown in FIG. 1 will be described. The outputs of the AE, AF and AWF data detectors 11, 12 and 13 are selectively coupled by a switch 24 to a single area integrator 14. Actually, since the AE, AF and AWF evaluation values are detected from the image signal, the CPU 17 controls the switching of the switch 24 in synchronism to the VD signal from the image pick-up circuit 4 for sequentially connecting the AE, AF and AWB data detectors 11–13 to the area integrator 14.

The area integrator 14 makes area integration via the multiplexer 16 by using either a first or a second evaluation value memory 15-1 or 15-2. The CPU 17 accesses the memory, which is not used for the area integration, via the multiplexer 16 to sequentially obtain the AE, AF and AWB evaluation values in synchronism to the VD signal. The CPU 17 then executes the AE, AF and AWF processes sequentially with the obtained evaluation values in synchronism to the VD signal. In the case of the electronic camera shown in FIG. 3, the AE, AF and AWF evaluation values can be taken only once in 3 VD cycles. With usual electronic cameras and column decoders, however, the VD (frame) rate is 60 Hz, so that their output movie images have no abnormal sense.

In the mean time, recently, the pixel density increase of digital cameras is in rapid progress. High pixel density images require long processing time because of great amount of their data. Long processing time inevitably results in low frame rate. In the electronic camera shown in FIG. 3, which is intended to reduce the circuit scale for cost reduction, and in which the AE, AF and AWB processes are executed only once in 3 VD cycles, if the frame rate is reduced, the interval of the individual processes is increased, resulting in output movie images which are very uncomfortable to watch. For example, such problems may arise that in the AE control the instant of brightness switching is clearly known, and that in the AF control the "on" and "off" times of the focusing lens are clearly discriminated from each other.

SUMMARY OF THE INVENTION

The present invention has been made in order to solve the above problems inherent in the prior art electronic cameras, and its specific object is to provide an electronic camera, which uses an image pick-up device of a very high pixel density although it is impossible to obtain the three, i.e., AE, AF and AWB, evaluation values for every frame due to a reduced scale of the circuit for the evaluation value computation, and can provide smooth movie images not giving any sense of uncomfortability and giving rise to no trouble in the photography in spite of a reduced movie image frame rate.

Other objects of the present invention are as follows.

A first object of the invention is to provide an electronic camera, which permits continuous images not giving any sense of uncomfortability to be obtained without possibility of sudden output change even in its application to an electronic camera, in which the frame switching time is long as in the case of using an image pick-up device of a high pixel density.

A second object of the invention is to provide an electronic camera, which can suppress image brightness variations even in the case when photoelectric charge is accumulated in a cycle capable of flicker cancellation.

A third object of the invention is to provide an electronic camera, which permits movie image output free from brightness hunting and giving no sense of uncomfortability in smoothness to be obtained even in the case when the timings of setting the photoelectric charge accumulation time and setting the gain control are deviated from each other.

A fourth object of the invention is to provide an electric camera, which permits smooth movie images to be obtained even at the time of auto focus control.

A fifth object of the invention is to provide an electronic camera, which can smoothly cope with brightness changes even when the scene is changed during movie image display.

A sixth object of the invention is to provide an electronic camera, which is free from delay generation even in a control signal process requiring a considerably long process time.

A seventh object of the invention is to provide an electronic camera, an electronic camera, which permits highly accurate auto focus control or auto focus control.

An eighth object of the invention is to provide an electronic camera, which is free from flicker generation even when it uses an image pick-up device of high pixel density.

A ninth object of the invention is to provide an electronic camera, which features smooth movie image area motion and is less subject to AWB or AE variations.

According to a first aspect of the present invention, there is provided an electronic camera comprising an image pick-up device, means for setting the photoelectric charge accumulation time of the image pick-up device, an image pick-up circuit for including gain control means, for processing a signal read out from the image pick-up device to obtain an image signal, and control signal processing means for sequentially obtaining a focus control signal, an exposure control signal and a white balance control signal for each image frame from the image signal from the image pick-up device and selectively controlling individual signal processes, wherein the gain of the image signal and the photoelectric charge accumulation time are controlled for each image frame by using the control signals from the control signal processing means.

With this construction, the image signal gain and the photoelectric charge accumulation time are controlled by using the control signals for each frame even in an electronic camera, in which the frame switching time is considerably long as in the case of using an image pick-up device of high pixel density. Thus, the gain control and the photoelectric charge accumulation time control are not suddenly changed, and it is possible to obtain continuous images not giving any sense of uncomfortability even when the images are displayed on a monitor or the like.

According to a second aspect of the present invention, there is provided the electronic camera according to first aspect, wherein the means for setting the photoelectric charge accumulation time of the image pick-up device can set the photoelectric charge accumulation time discretely so that the photoelectric charge accumulation time can be changed to values free from flicker, and sets the photoelectric charge accumulation time variably in combination with gain control by gain control means.

In an area where the fluorescent lamp is driven at 100 Hz, when photoelectric charge is accumulated in a time which is inversely proportional to an integral multiple of 50 Hz in order eliminate flicker on a monitor screen or the like, the photoelectric charge accumulation amount is changed greatly whenever the photoelectric charge accumulation time is changed, thus greatly changing the image brightness. By combining the photoelectric charge accumulation time changes with the gain control as in the above construction, it is possible to reduce image brightness variations and obtain smooth images not giving any sense of uncomfortability.

According to a third aspect of the present invention, there is provided the electronic image pick-up means according to the first aspect, wherein the means for setting the photoelectric charge accumulation time of the image pick-up device sets the level of the image signal with combination of the setting of the photoelectric charge accumulation time and gain control by gain control means, and the gain of image signal based on photoelectric charge accumulated after control of the photoelectric charge accumulation time of the image pick-up device is controlled after one vertical sync cycle.

Deviation of the timings of the photoelectric charge accumulation time setting and the gain control setting may result in failure of smooth brightness increase or reduction, giving rise to hunting. By using the above construction, it is possible to improve the exposure control accuracy and obtain smooth moving images not giving any sense of uncomfortability.

According to a fourth aspect of the present invention, there is provided the electronic camera according to one of the first to third aspects, which further comprises photographing lens focus driving means driven for every frame.

This kind of photographing lens driving for every frame may improve the intermittent movement of the photographing lens and obtain smooth moving images.

According to a fifth aspect of the present invention, there is provided the electronic camera according to one of the first to fourth aspects, wherein gain control by gain control means and control of the photoelectric charge accumulation time of the image pick-up device are controlled by increasing or reducing them in predetermined ratios.

By this structure, it is possible to smoothly cope with the brightness change due to scene change.

According to a sixth aspect of the present invention, there is provided the electronic camera according to one of the first to fifth aspects, wherein the control signal processing means makes preparations for a signal process on a control signal to be provided by signal processing one vertical sync cycle afterwards while executing a signal process on a pertinent one of the control signals.

With this construction, it is possible to execute without time delay the control signal processing which requires a large amount of computations and complex processings.

According to a seventh aspect of the present invention, there is provided the electronic camera according to one of the first to sixth aspects, wherein the control signal processing means first executes the signal process on the exposure control signal and then executes the signal processes on the focus control signal and the white balance control signal.

By using this auto focus control and white balance control with the exposure condition set based on the automatic exposure control, it is possible to adjust appropriate or optimum exposure extent necessary for the control and obtain the auto focus control and white balance control with high accuracy.

According to an eighth aspect of the present invention, there is provided the electronic camera according to one of the first to seventh aspects, wherein the means for setting the photoelectric charge accumulation time of the image pick-up device sets the time of switching of the photoelectric charge accumulation time for each frame to an integral multiple of 1/100.

Thus it is possible to suppress the flicker even with the image device having high pixel density.

According to a ninth aspect of the present invention, there is provided the electronic camera according to the fourth aspect, wherein the summation of the time necessary for the driving of the photographing lens by the photographing lens focus driving means and the computation time of the signal process on the focus control signal from the control signal processing means does not exceed one vertical sync cycle time.

With this construction, the movement of moving images may be smoothed and the changes in AWB and AE may be reduced.

Other objects and features will be clarified from the following description with reference to attached drawings.

PREFERRED EMBODIMENTS OF THE INVENTION

Preferred embodiments of the present invention will now be described with reference to the drawings.

Figure 1:
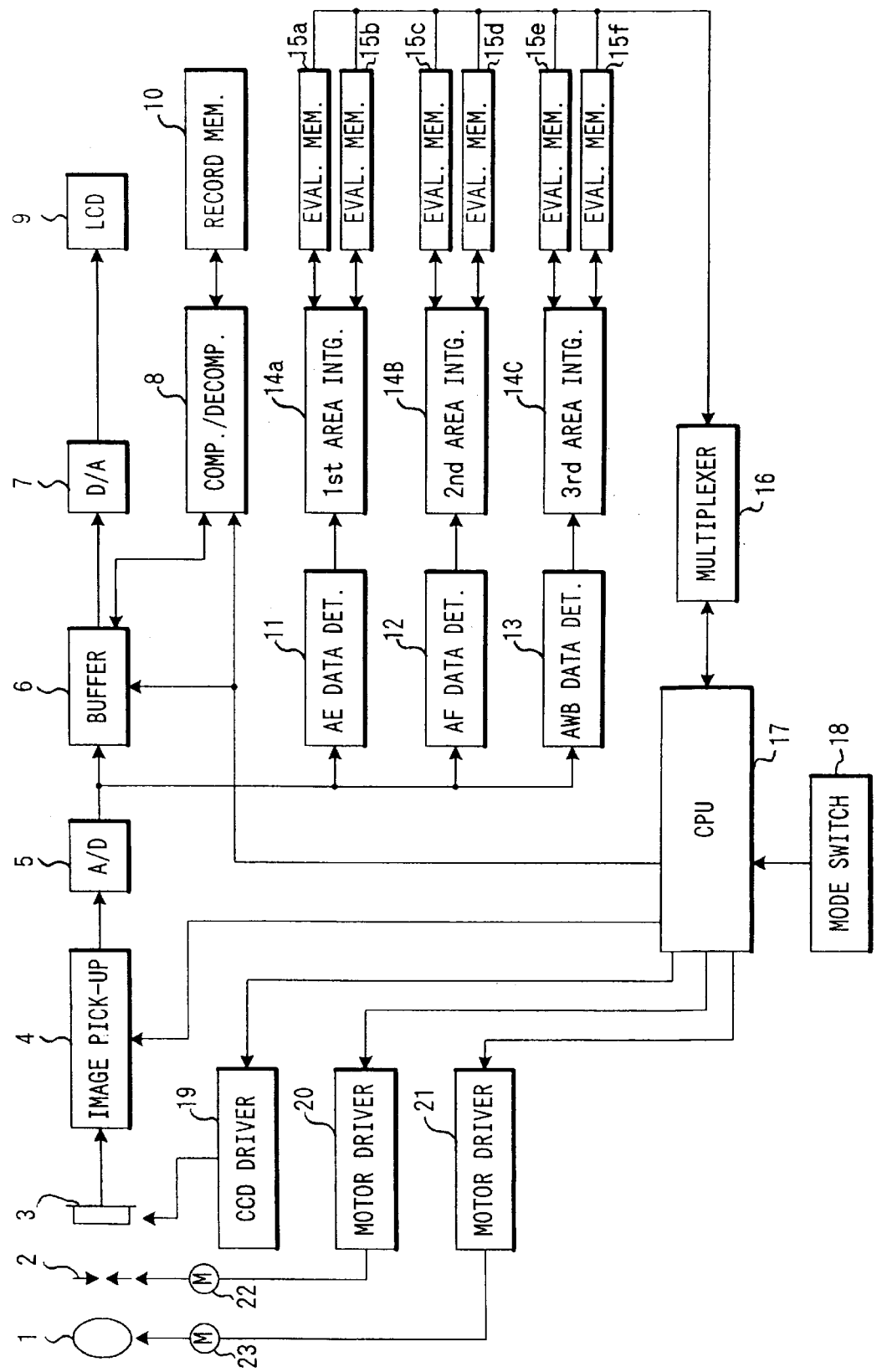
FIG. 1 shows a block diagram of a prior art an electronic camera having AE, AF and AWB control function.
Figure 2:
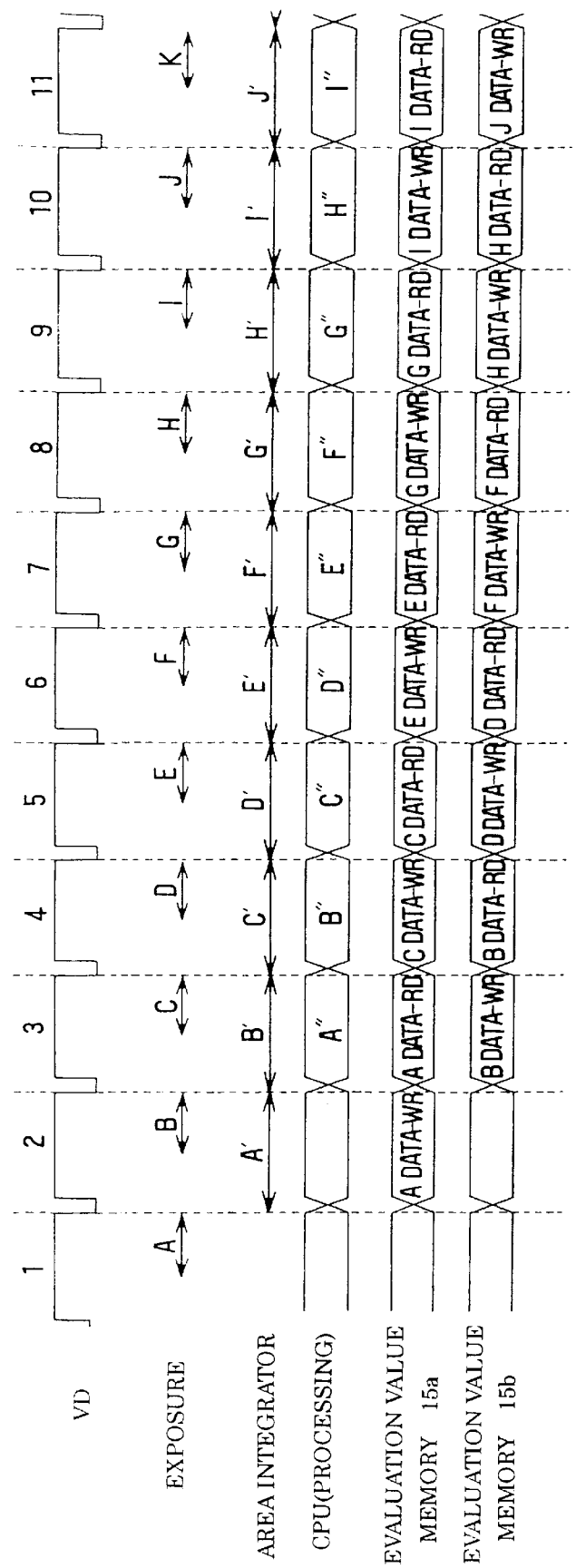
FIG. 2 is a timing chart for describing an area integration executed by accessing two evaluation value memories.
Figure 3:
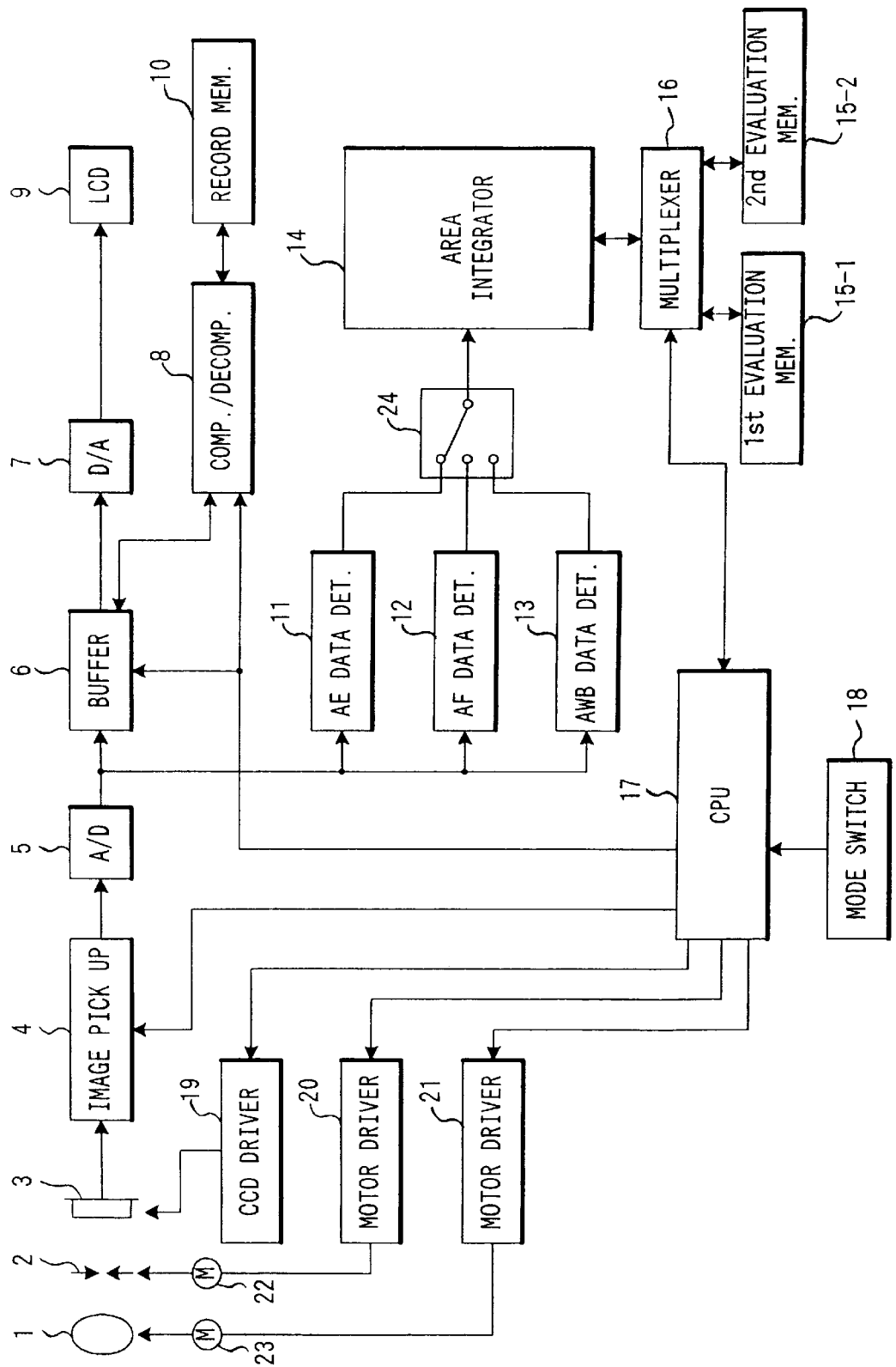
FIG. 3 shows another example of the electronic camera construction having AE, AF and AWB control function.
Figure 4:
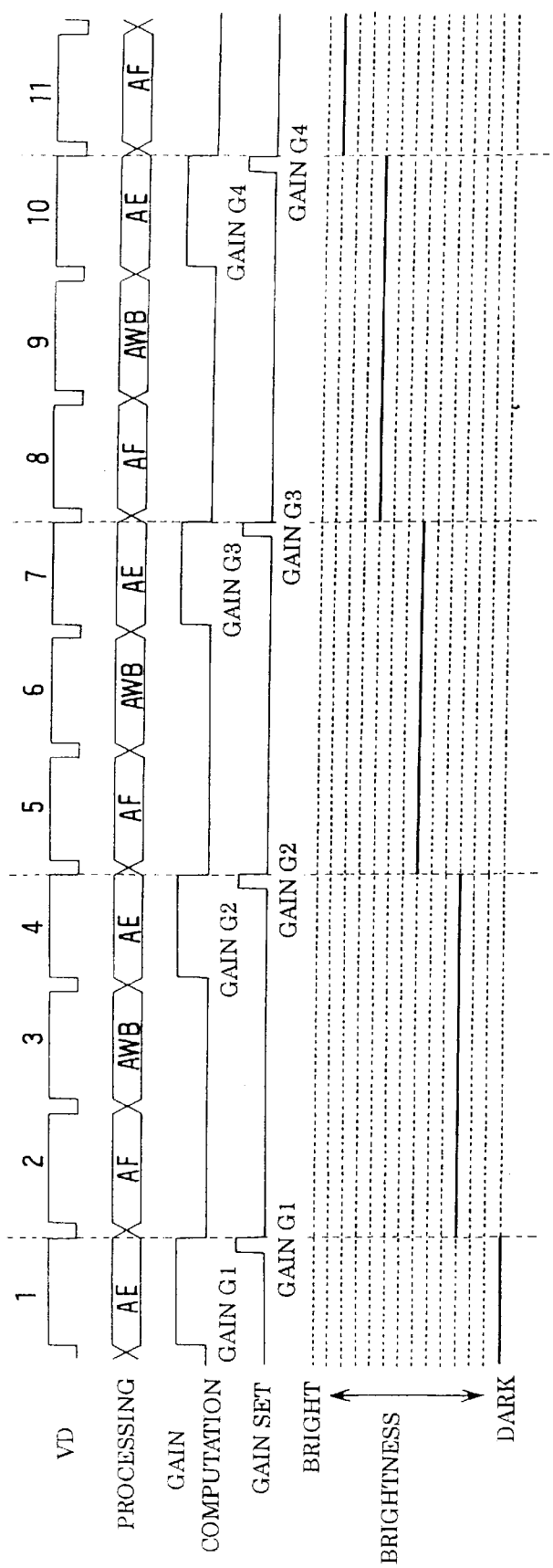
FIG. 4 is a timing chart for describing the operation of setting the gain once in three frames in the electronic camera shown in FIG. 3.
Figure 5:
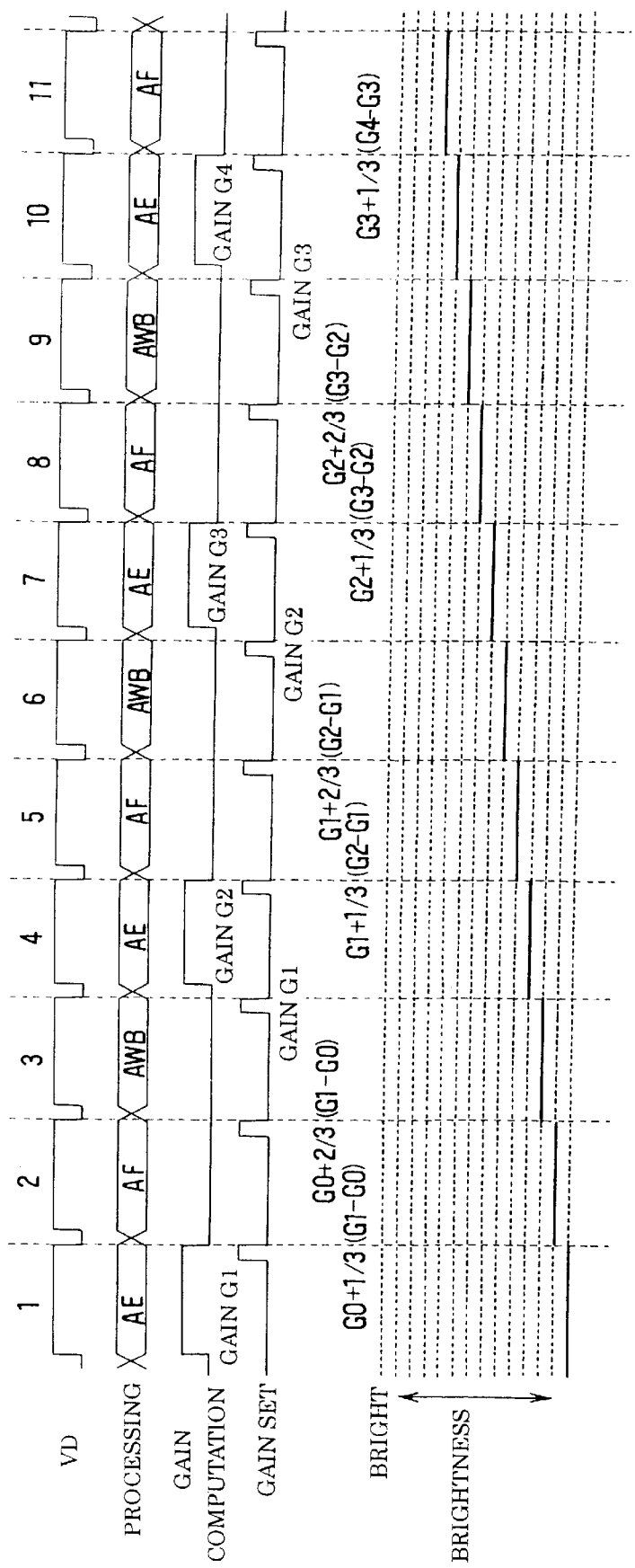
FIG. 5 is a timing chart for describing the operation of setting the gain for each frame according to a first embodiment of the present invention in the electronic camera shown in FIG. 3.

The electronic camera according to the present invention has the same construction as the one shown in FIG. 3 except for the status of control by the CPU. The construction of the electronic camera shown in FIG. 3 has been described before, and will not be described here. A first embodiment of the status of control by the CPU will now be described, which permits smooth output image brightness changes free from sense of uncomfortability by setting the gain of the image signal and the shutter speed without obtaining the evaluation value for each frame. For the sake of facilitating the understanding, the prior art status of output image brightness control with the gain and the shutter speed will be described in greater detail. Where the circuit scale is reduced, the CPU 17 can take, only either one of the three, i.e., AE, AF and AWB, evaluation values. For matching the three, i.e., AE, AF and AWB, controls with high speed, it is better to execute the AE, AF and AWB processes sequentially in synchronism to the vertical drive signal (VD) of the image signal in a 3-frame cycle. This status of control is particularly convenient in such case as when the frame rate is 60, 30 and 15 Hz, because in these cases flicker cancellation effect is also obtainable.

Where the AE, AF and AWB controls are executed in a 3-frame cycle, the AE process is executed only once in three frames, and it is thus necessary to compute the gain setting value in the frame of the pertinent sequential order and set the gain to the obtained setting value. FIG. 4 is a timing chart showing the prior art status of control. In this case, in the 1-st VD cycle which is allotted for the AE process is executed, the CPU 17 obtains the AE evaluation value, and computes gain setting value G1. Toward the end of the 1-st VD cycle, the gain setting value G1 is set in the image pick-up circuit 4. In the 4-the VD cycle which is again allotted to the AE process, the CPU 17 also computes gain setting value G2, and sets the gain setting value G2 in the image pick-up circuit 4. Likewise, in 17-th and 10-th periods, the CPU 17 computes gain setting values G3 and G4, and sets these values.

With the updating of the gain setting value once in three frames in the above way, the output image brightness is changes once for every three frames. If the frame rate is very low due to high pixel density or the like, therefore, the instant of brightness change is clearly seen, so that the movie image is uncomfortable.

To solve the above problem in the prior art control status, in which the gain setting is executed only once in three frames, according to the instant embodiment the gain is set for each frame. The CPU 17 executes the AE, AF and AWB processes sequentially in synchronism to the VD cycle. In the 1-st VD cycle which is allotted for the AE process, the CPU 17 computes gain setting value G1 on the basis of the AE evaluation value. If the gain setting value at this time (hereinafter referred to as present time) is G0, the CPU 17 sets the sum of the gain setting value G0 and ⅓ of the difference between the gain setting value G0 at the present time and gain setting value G1 to be newly set, i.e., G0+(G1−G0)/3, is set in the image pick-up device 4. In the 2-nd VD cycle, which is allotted to the AF process, the CPU 17 sets the sum of G0 and ⅓ the difference between the gain setting values G1 and G0, i.e., G0+2(G1−G0)/3, in the image pick-up circuit 4. In the 3-rd VD cycle, which is allotted not to the AE process but to the AWB process, the CPU 17 makes the gain setting gain in the image pick-up circuit 4. This setting value is G0+3(G1−G0)/3=G1.

Likewise, in the 4-th VD cycle allotted to the AE process, the CPU 17 computes new gain setting value G2 on the basis of the AE evaluation value, and sets G1+(G2−G1)/3 on the basis of the gain setting value G1 of the present time and the gain setting value G2 to be newly set. In the 5-th VD cycle G1+2(G2−G1)/3 is set, and in the 6-th VD cycle G2 is set. Movie operation which is executed in a 3-frame period will be described later with reference to the flow chart of FIG. 9. Although the gain setting value computation is executed only once in every three frames in the above way, the gain setting in the image pick-up circuit 4 is executed in every frame to obtain smooth brightness change, thus obtaining movie image output giving no sense of uncomfortability to the user.

While the embodiment of the status of smooth brightness variation by setting the gain in every frame, with respect to the shutter speed which is set for the CCD driver 19, the same effect is obtainable by setting the shutter speed in every frame although the shutter speed is computes only once with the AE evaluation only once in three frames.

Now, exposure control will be described in connection with the case when the shutter speed is set to a certain particular value and also with the case when the shutter speed can not be set finely in a staircase fashion. By the term "the case when the shutter speed is set to a certain particular value" is meant such a case when the shutter speed is set solely to 1/00 or 1/50, for instance, suppressing image flicker in photography under fluorescent lamp illumination, and by the term "the case when the shutter speed can not be set finely in a staircase fashion" is meant such a case the shutter is released at high speeds in outdoor photography in broiling weather. The fluorescent lamp or like illumination tool is driven at 50 or 60 Hz. In the case of a frame rate of 60 or 30 or 15 Hz, no image flicker is produced when the illumination device is driven at 60 Hz. When the illumination device is driven at 50 Hz, however, image flicker is produced. In this case, the image flicker can be removed by setting the shutter speed to 1/100 to 1/50.

With an electronic camera, the shutter speed of high speed shutter is usually set to a multiple of the horizontal sync signal (HD). In the case of an HD time of 62.8 microseconds, when the exposure time is one HD, the shutter speed is 1/1,600. When the exposure time is 2 HDs, the shutter speed is 1/8,000, which corresponds to double the brightness in the case of the shutter speed of one HD. When the exposure time is set to 3 HDs, the shutter speed is 1/5,300, and the brightness is 1.5 times the brightness in the case of the shutter speed of 2 HDs. The shutter speed of the high speed shutter thus can not be set finely on the high speed side, so that accurate exposure control can not be obtained.

Figure 6:
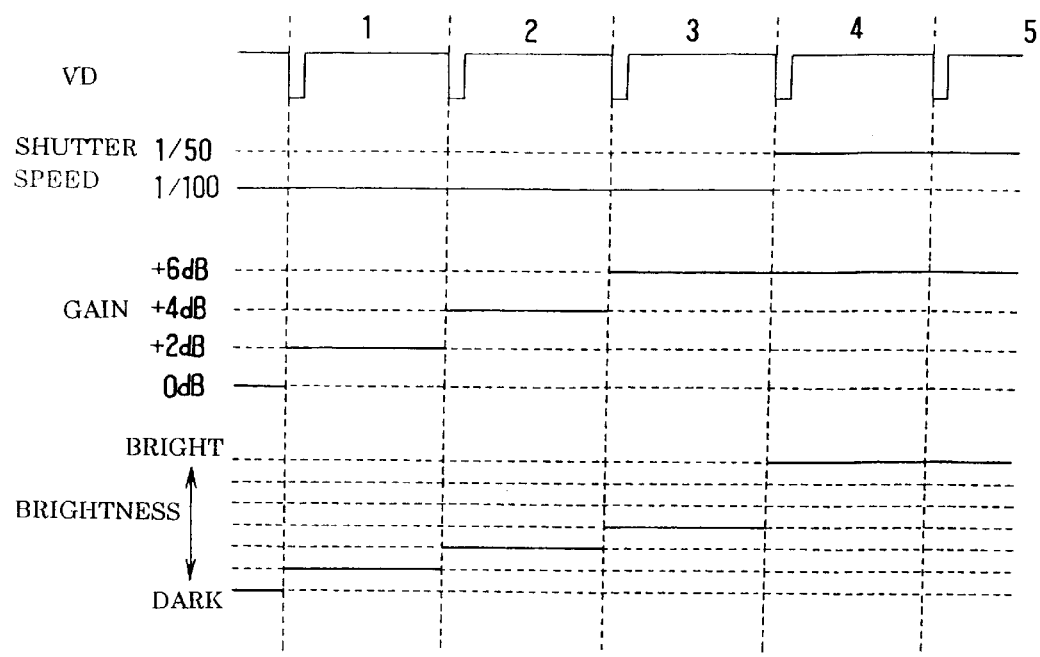
FIG. 6 is a timing chart for describing the operation when the shutter speed is changed after increasing the gain to the maximum one in the electronic camera shown in FIG. 3.

FIG. 6 is a timing chart for describing the status of control in a case (prior art case) of suddenly changing the shutter speed without consideration of output image brightness changes when the shutter speed can be set to 1/100 or 1/50 for suppressing image flicker in indoor photography or when high speed shutter is used in outdoor photography in broiling weather. Referring to the Figure, the gain is increased by +2 dB for each VD cycle form the 1-st to the 3-rd VD cycle, and reaches the maximum in the 3-rd VD cycle as a result of its increase by +6 dB from the outset. Since the gain can no further be increased, in the 4-th VD cycle the shutter speed is changed from 1/10 to 1/50. No intermediate shutter speed is used in order to suppress the image flicker as noted above. By changing the shutter speed from 1/00 to 1/50 the brightness of the output image is doubled. Double the brightness means a signal level increase by about 6 dB. This means the brightness which has been changed by +2 dB at each time, is suddenly changed by +6 dB as a result of the shutter speed change. Consequently, the brightness is suddenly changed greatly, resulting in very uncomfortable movie image.

Figure 7:
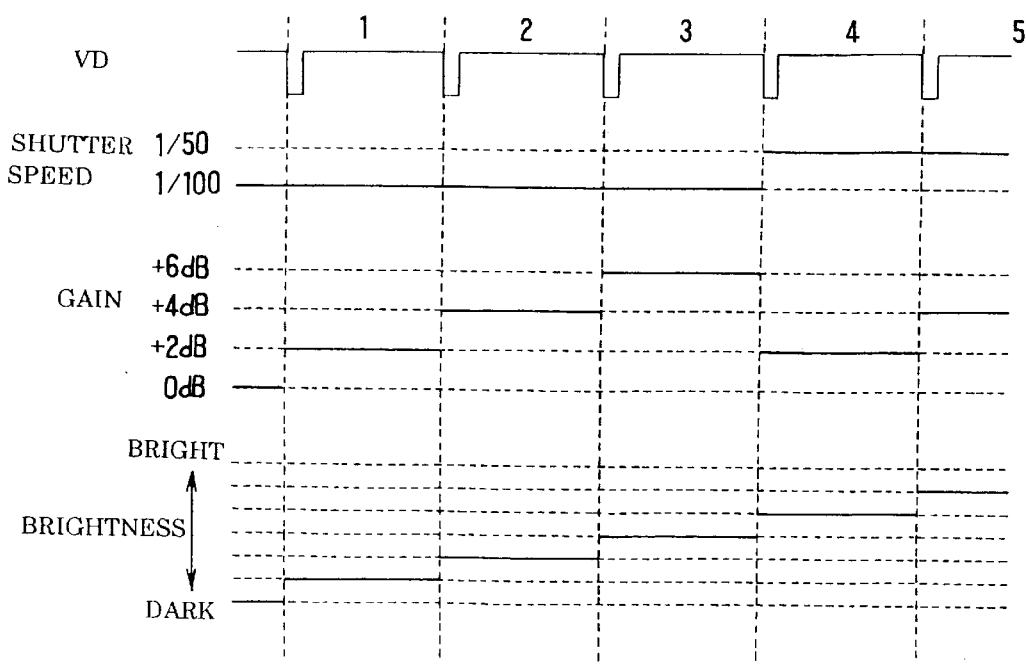
FIG. 7 is a timing chart of a second embodiment of the present invention for describing the operation of correcting the rapid brightness change due to increase of shutter speed by the gain in the electronic camera shown in FIG. 3.

A second embodiment of the present invention, which seeks to solve the problem in the prior art control status shown in FIG. 6, will now be described with reference to the timing chart of FIG. 7. Referring to FIG. 6, the gain is increased by +2 db for each VD cycle from the 1-st to the 3-rd VD cycle. When changing the shutter speed from 1/100 to 1/50 in the 4-th VD cycle, the gain is reduced by 4 dB. Thus, despite the shutter speed change from 1/10 to 1/50, the image brightness change in the 4-th VD cycle is +2 dB. In this way, it is possible to prevent sudden great brightness change.

It is known in advance how much the output image brightness is changed by changing the shutter speed in the case of setting a certain particular shutter speed or setting the shutter speed of the high speed shutter. It is thus possible to smoothly change the output image brightness by reducing the gain in correspondence to the brightness change in excess of a desired change with the shutter speed change, that is, by combining the shutter speed change and the gain control.

Figure 8:
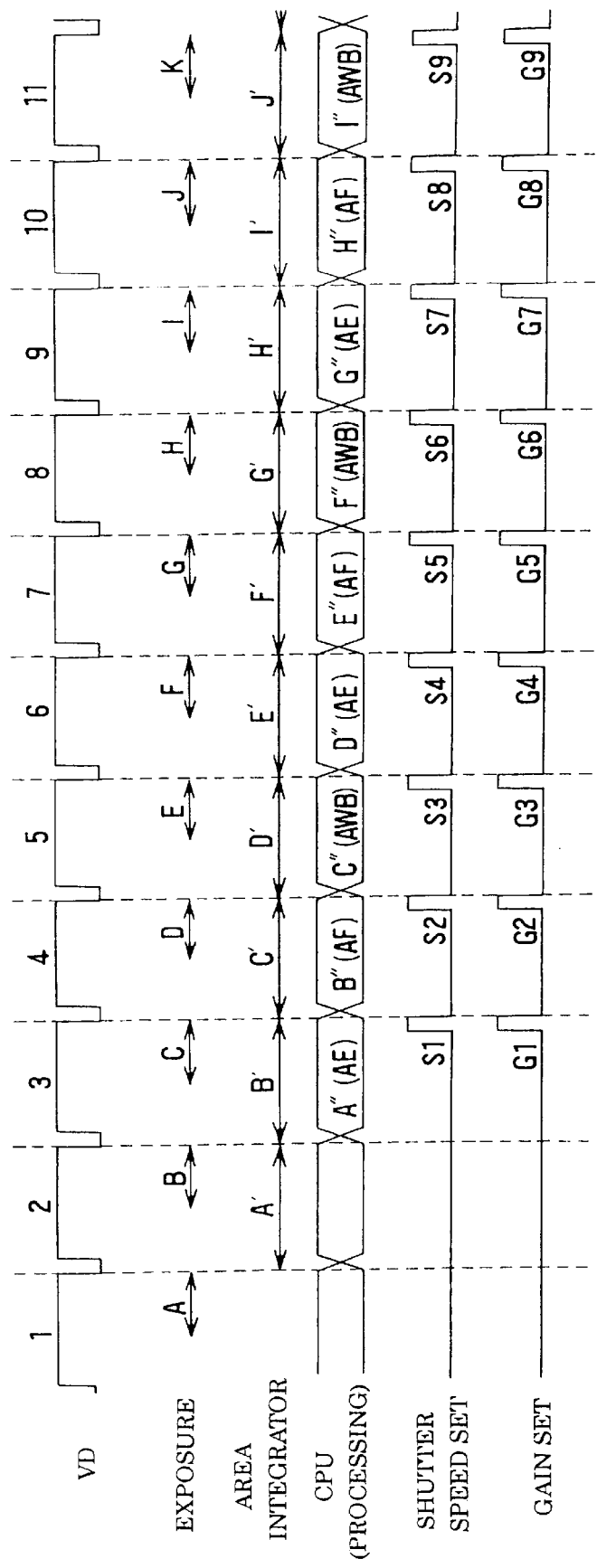
FIG. 8 is a timing chart for describing the operation of computing the shutter speed gain on the basis of the AE evaluation value in the electronic camera shown in FIG. 3.

Now, the setting of the shutter speed and gain on the basis of the AE evaluation value and the delay until appearance of the effect of the newly set shutter speed and gain will be described with reference to the timing chart of FIG. 8. Referring to FIG. 8, exposure data A is obtained by exposure in the 1-st VD cycle. In the 2-nd VD cycle, the area integrator 14 integrates the exposure data A to obtain AE evaluation value A'. In the 3-rd VD cycle, the CPU 17 executes the AE process with the AE evaluation value A' to obtain AE process result A". Thus the process for the real exposure data is executed after two frames. In the 3-rd VD cycle, the shutter speed and gain to be set at the end of the 3-rd, the 4-th and 5-th VD cycles (i.e., at the outset of the 4-th, 5-th and 6-th periods) are computed from the process result A".

The shutter speed is reflected on the next exposure. That is, the shutter speed S1 set at the end of the 3-rd VD cycle, is reflected on exposure data D obtained by exposure in the next 4-th VDS period. The gain is also reflected on the next area integration, for the photographing signal obtained by exposure at the shutter speed S1 is processed subsequent to the next VD cycle. Thus, the gain G1 set at the end of the 3-rd VDS period is reflected on the result C' of area integration in the next 4-th VD cycle. Since the effects of the shutter speed and gain appear after different delay times from their setting, this difference should be taken into considerations when setting the next shutter speed and gain. For example, at the end of the 6-th to 8-th periods the shutter speed and gain should be set by taking it into account that the AE process result D" in the 6-th VD cycle will have not been reflected on up to the shutter speed S1 and gain G2.

Figure 9:
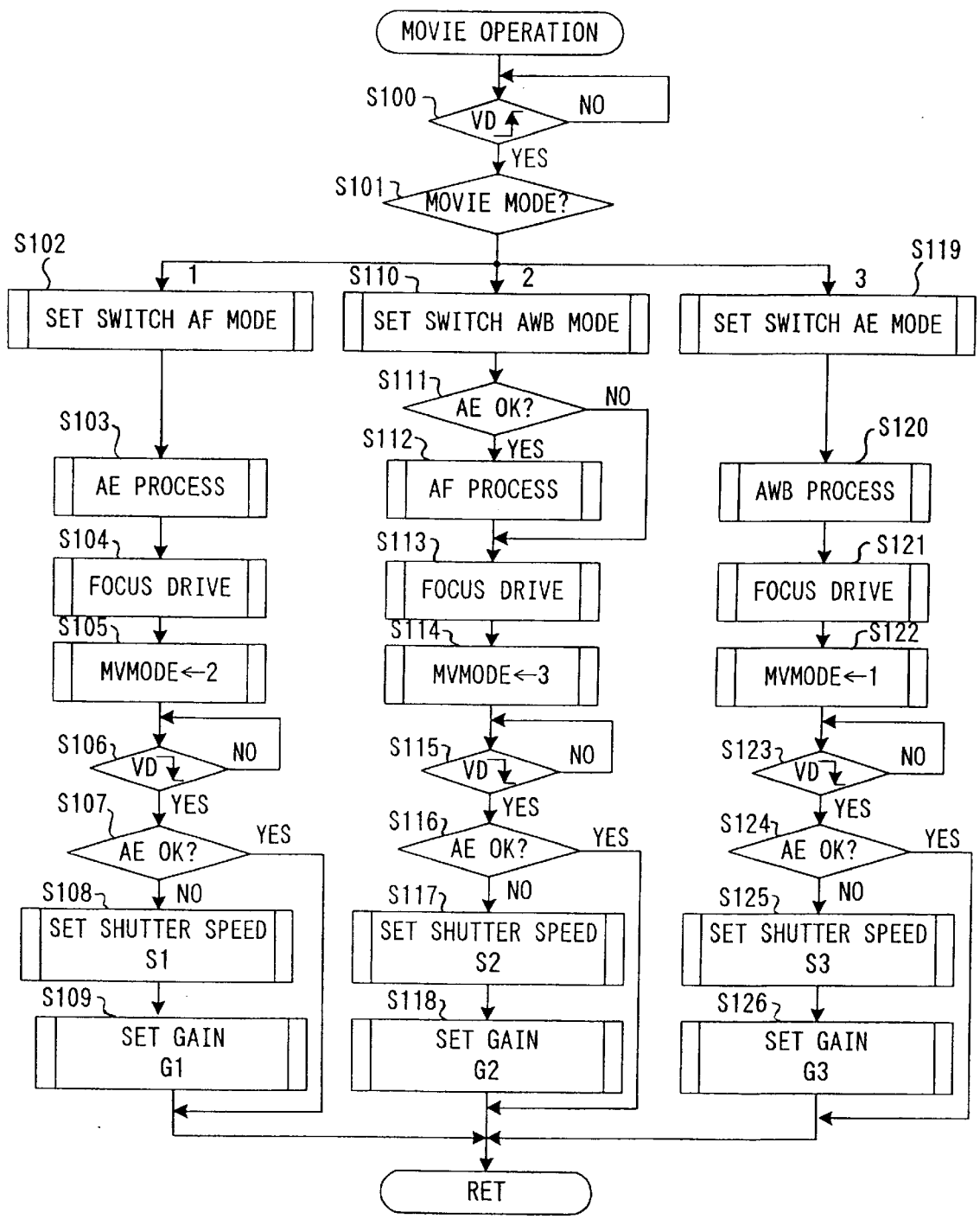
FIG. 9 is a flow chart illustrating a movie operation routine of iteratively executing the AE, AF and AWB processes to output movie images to the liquid crystal display.

Now, a method of setting (i.e., computing) the shutter speed and gain with considerations of the delay until appearance of the effects of the shutter speed and gain, will be described with reference to flow charts. FIG. 9 is a flow chart illustrating a movie operation routine of iteratively executing the AE, AF and AWB processes to output movie images to the liquid crystal display. This routine is executed to output movie images in such case as when setting the image angle. In the outset of the routine, the rising of VD is waited (step S100). The AE, AF and AWB processes should be synchronized to VD, because they are executed by using the image signal. In response to the detection of the rising of VD, movie mode MVMODE is checked (step S101). When MVMOIDE=1, the routine goes to a switch setting step S102, to execute the AE process. When MOVMODE=2, the routine goes to a switch setting step S110 to execute the AF processes. When MVMODE=3, the routine goes to a switch setting step S119 to execute the AWB. It is assumed that the CPU 17 takes AE data at the outset of the AE process. Since the CPU 17 should process AF data after one VD cycle in which it executes the AE data, the switch 24 is immediately switched at this moment for connection to the AF data detector 12 to be ready for taking the AF data (step S102).

Subsequent to the step S102, an AE process S103 is executed. In the AE process step S103 the shutter speed S1 and gin G1 to be set for the present frame, S2 and G2 to be set for the next frame and S3 and G3 to be set for the frame next to the next frame, are computed. In a subsequent step S104, the focus lens is driven. The focus lens is driven by an amount determined by a method, which will be described later. In order to obtain output movie images giving no sense of uncomfortability, the focus lens is driven for every frame irrespective of the movie mode MVMODE. In a subsequent step S105, the CPU 17 sets MVMODE=2 so that the AF process mode will be set up for the next frame. In a step S108, the shutter speed S1 is set, and in a step S109 the gain G1 is set. If the shutter speed and gain are set during the high period of VD, however, the brightness of the output images is suddenly changed. For this reason, the setting is executed during the low period of VD. To this end, a preceding step S106 is provided, in which a check is executed as to whether VD has fallen. In addition, since the setting of the shutter speed and gain is executed when and only when AE not all right (i.e., OK), another preceding step S107 is provided, in which a check is executed as to whether AE is OK. When AE is OK, the routine is ended. When AE is not OK, the shutter speed and gain are set in the subsequent steps (steps S108 and S109).

When it is detected in the step S101 that MVMODE=2, a step S110 and following steps are executed. The CPU 17 first takes AF data via the switch 24. Although the routine goes to the AF process when MVMODE=2 as described before, like the case when MVMODE=1, at which time the CPU 17 executes the step S102 to make it ready to take the AF data, the switch 24 is switched for connection to the AWB detector 13 for executing the AWB signal process after one VD. In a subsequent step S111, AE is checked. When it is found in this step that AE is OK, the CPU 17 executes the AF process (step S112). The AF process is a commonly called mountain-climbing process. Unless AE is OK, the AF process would result in reduction of the AF accuracy. For this reason, the AF process is executed when and only when AE is OK. The auto focus system of the mountain-climbing process is one, in which scene contrast data (contrast value) representing the degree of focus is obtained according to the image signal when the focus adjusting lens is advanced or retreated, a lens position at which the contrast value is maximum (maximum contrast position) is determined to be a focus position, and the focus adjusting lens is driven to that position. Subsequent steps S113 to S118 until the setting of the shutter speed and gain are like the steps S104 to S109 in the case of the AE process. When it is found in the step S101 that MVMODE=3, the step S119 is executed. In the step S119 the switch 24 is switched for connection to the AE detector 11, and then it executes the AWB process (step S120). Subsequent steps S121 to S126 are like the steps S104 to S109 in the case of the AE process.

Figure 10:
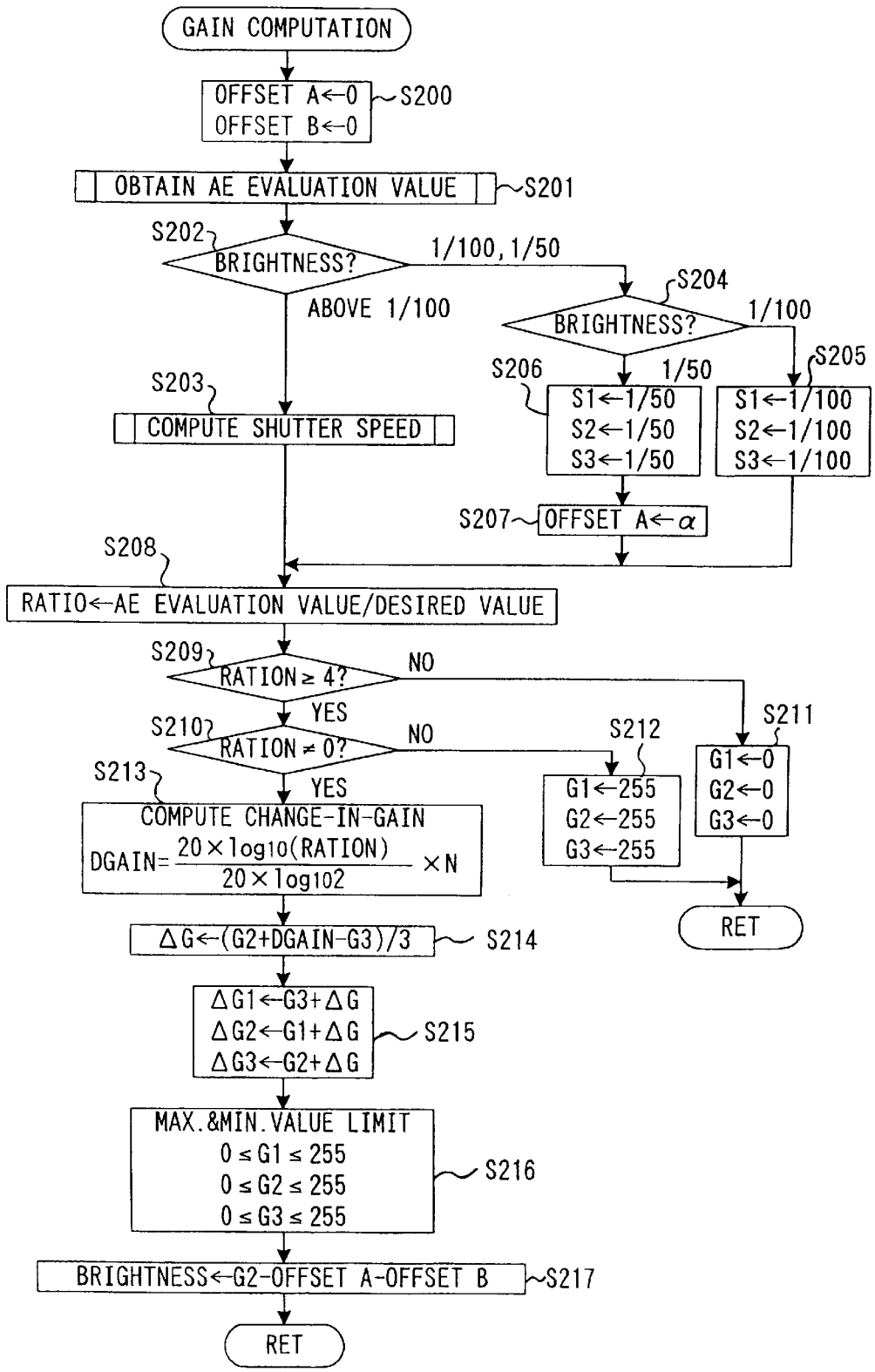
FIG. 10 is a flowchart for describing a gain computation process in the AE process step of the flow chart of FIG. 9.

Now, a gain computation process will be described with reference to the flow chart of FIG. 10. This gain computation process is called in the AE process step (S103) in the movie operation routine of the flow chart of FIG. 9. At the outset of this routine, the CPU 17 initializes offsets A and B (step S200). In this embodiment of the control status, the brightness (i.e., brightness of the scene) is controlled with the gain at shutter speed of 1/100. So long as the camera is always operated at the shutter speed of 1/100, the brightness can be judged with the sole gain. Actually, however, various shutter speeds are used. Accordingly, when the shutter speed is changed from 1/100, the gain is corrected or controlled with the offset, thus obtaining proper brightness control. The offset A is used when the shutter speed is changed from 1/100 to 1/50, and the offset B is used when the shutter speed is changed from 1/100 to a higher speed.

In the instant embodiment of the electronic camera, only shutter speeds 1/100 and 1/50 can be used for scenes, which are not so bright and judged to be indoor ones. This shutter speed limitation is provided in order to evade adverse effects of flicker. For bright scenes, it is made possible to set the shutter speed in a range of 1/100 to 1/1,600 at an interval of HD. After the offset initialization, the CPU 17 obtains the AE evaluation value (step S201). Specifically, the CPU 17 reads out integration results from the evaluation memories 15-1 and 15-2, and computes the AE evaluation value by weight multiplification, which is set for each of a plurality of image area divisions.

The CPU 17 then checks the brightness. First, the CPU checks whether the brightness is such that a shutter speed higher than 1/1000 is to be used adequately or that a shutter speed lower than 1/100 is to be used adequately (step S202). Then he CPU 17 then checks whether the brightness is such that the shutter speed 1/100 or 1/50 is adequate (step S204). When it is determined that a shutter speed higher than 1/100 is adequate, the CPU 17 computers the shutter speed (step S203). The shutter speed is computed in a method to be described later. When it is determined that the shutter speed 1/100 is adequate, the CPU 17 sets an exposure time (i.e., number of HDs) corresponding to the shutter speed of 1/100 as shutter speed S1 to be set in the present frame (step S205), and it also sets the same shutter speed as shutter speeds S2 and S3 in the next two frames (step S205). When it is determined that the shutter speed of 1/50 is adequate, the CPU 17 sets an exposure time (i.e., a number of HDs) corresponding to the shutter speed of 1/50 as S1 to S3 (step S206). Then the CPU 17 substitutes a correction value a for brightness corresponding to the change in the shutter speed from 1/100 for the offset A (step S207). With the change in the shutter speed from 1/100 to 1/50, the brightness is doubled. Thus, α is the gain corresponding to double the brightness.

After setting the adequate shutter speed, the CPU 17 computes the gain setting value. The gain setting value is computed from the ratio of the obtained AE evaluation value to desired AE evaluation value. First, the CPU 17 computes the ratio noted above (step S208). Then the CPU 17 checks whether the computed ratio is no less than 4 (S209). When the ratio is no less than 4, the brightness is very high. In this case, the CPU 17 thus sets the minimum gain (step S211). Then, the CPU 17 checks whether the ratio is zero (step S210). When the ratio is zero, the brightness is very low so that the image is dark. The CPU 17 thus sets the maximum gain (step S212). In this embodiment of the control status, the gain is variable in a range form 0 to 255. That is, the minimum gain obtainable is zero, and the maximum value obtainable is 255. In the steps S211 and S212, G1 is the gain set for the present frame, G2 is the gain set for the next frame, and G3 is the frame set for the frame next to the next frame. After the ratio has been obtained, the CPU 17 computes change-in-gain (DGAIN) (step S213). In the formula shown in the step S213), N is the gain setting value corresponding to double the brightness as a change therein, and DGAIN is the change in gain which is desired to be set up to the next AE process after three frames. The CPU 17 thus computes the AG in gain for one frame from DGAIN thus obtained step (S214).

The computation of ΔG will now be described. The change ΔG in gain for one frame is ⅓ of the change in gain for three frames, and it is thus given as:

$$\Delta G = \text{(change in gain for three frames)}/3 \tag{1}$$

The change in gain for three frames is the difference between the value set in the present AE process and the value set in the preceding AE process to have the AE evaluation value to approach the desired value. That is, ΔG is more specifically given as:

$$\Delta G = \text{(present setting value} - \text{preceding setting value)}/3 \tag{2}$$

The gain which is set finally in the preceding AE process is G3. As described before in connection with the timing chart of FIG. 8, the gain G3 has been set in the frame immediately preceding the present AE process, and its result is not reflected on the AE evaluation value obtained in the present AE process. Thus, ΔG can be further given as:

$$\Delta G = \text{(present setting value} - G3)/3 \tag{3}$$

The value that is to be set in the present AE process, is the sum of the change DGAIN in gain to have the AE evaluation value obtained in the step S213 approach the desired AE evaluation value and the gain reflected on that evaluation value. As described before in connection with the timing chart of FIG. 8, only up to gain G2 set in the frame preceding by two frames is reflected on the evaluation value that is used in the present AE process. Thus, G is computed as:

$$\Delta G = (G2 + \text{DGAIN} - G3)/3 \tag{4}$$

After obtaining the change ΔG in gain for one frame, the CPU 17 computes the gains G1 to G3 to be actually set in the present, next and next to the next frames (step S215). The gain G1 to be set for the present frame is computed by adding the change ΔG in gain for one frame to the gain G3 set in the preceding frame. The gain G2 to be set for the next frame is computed by adding the change ΔG in gain for one frame to the gain G1 set in the present frame. The gain G2 to be set in the frame next to the next frame is computed by adding the change ΔG in frame for one frame to the gain G2 set for the next frame. When the gains G1 to G3 to be set is less than zero (minimum value) or greater than 255 (maximum value), the CPU 17 sets zero or 225 (step S216). Then the CPU 17 updates the brightness check variable for the next gain computation process (step S217). The variable updating is executed with G2 taken as reference for only up to G2 is reflected on the evaluation value.

Figure 11:
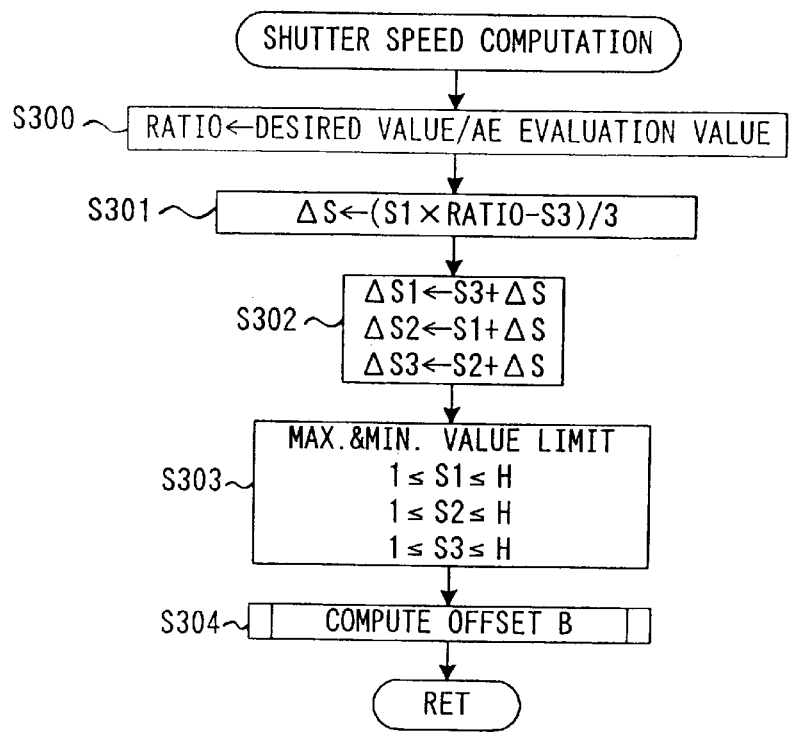
FIG. 11 is a flow chart for describing the process of shutter speed computation in the flow chart of FIG. 10.

The process of shutter speed computation will now be described with reference to the flow chart of FIG. 11. This process is executed in the shutter speed computation step (S203) shown in the flow chart of FIG. 10. The shutter speed, like the gain, is computed from the ratio of the obtained AE evaluation value to the desired AE evaluation value. The CPU 17 thus first computes the ratio (step S300). The shutter speed is changed by changing the exposure time (i.e., number of HDS) in the CCD driver 19. The exposure time should be made the shorter the higher the brightness (i.e., brightness of the scene). Thus, in the instant computation of the ratio, the numerator and denominator in the ratio in the step S206 shown in the flow chart of FIG. 10 are interchanged. After obtaining the ratio, the CPU 17 computes change $\Delta S$ in the shutter speed for one frame from the ratio thus obtained (step S301).

The computation of $\Delta S$ will now be described. The change $\Delta S$ in shutter speed for one frame is 1/3 of the change in shutter speed for three frames, and is thus given as:

$$\Delta S = \text{(change in shutter speed for 3 frames)}/3 \qquad (5)$$

The change in shutter speed for three frames is the difference between the value set in the present AE process and the value set in the preceding AE process to have the AE evaluation value to approach the desired value. More specifically $\Delta S$ is given as:

$$\Delta S = \text{(present setting value–preceding setting value)}/3 \qquad (6)$$

The shutter speed that has last been set in the preceding AE process is S3. As described before in connection with the timing chart in FIG. 8, S3 is the shutter speed for the frame right before the present AE process. The result S3 is not reflected on the AE evaluation value which is obtained in the present AE process. Thus, $\Delta S$ can be further pressed as:

$$\Delta G = \text{(present setting value–}S3\text{)}/3 \qquad (7)$$

The value that is set in the present AE process is the product of the ratio, which has been obtained in the process S300 to have the AE evaluation value to approach the desired AE value, and the shutter speed reflected on that evaluation value. Also, as described before in connection with the timing chart shown in FIG. 8, only the shutter speeds up to S1 set for the preceding three frames are reflected on the evaluation value used in the present AE process. Consequently, $\Delta S$ is computed as $$\Delta S = (S1 \times \text{ratio} - S3)/3 \qquad (8)$$

After obtaining the change $\Delta S$ in shutter speed for one frame, the CPU 17 computes the shutter speeds which are to be set for the present, next and next to the next frames (step S302). The shutter speed S1 to be set for the present frame is obtained by adding $\Delta S$, i.e., the change in shutter speed for one frame, to the shutter speed S2 set for the preceding frame. The shutter speed S2 to be set for the next frame is obtained by adding $\Delta S$ to the shutter speed S1 set for the present frame. The shutter speed S3 to be set for the fame next to the next frame is obtained by adding $\Delta S$ to the shutter speed S2 set for the next frame. When the shutter speeds S1 to S3 to be set are lower than 1 (i.e., minimum speed) or higher than H (maximum speed), the CPU 17 sets 1 or H (step S303). Here, H is maximum exposure time (number of HD). After the shutter speed setting, the CPU 17 then computes the offset B for checking the brightness for the next shutter speed computation process (step S304).

Figure 12:
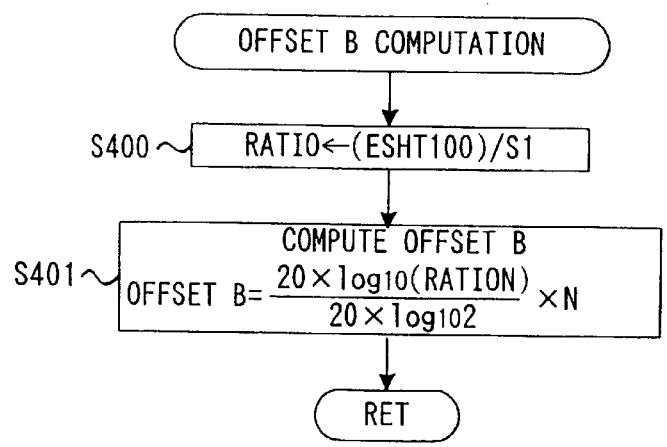
FIG. 12 is a flow chart for describing the computation of offset B in the flow chart of FIG. 11.

The computation of offset B will now be described with reference to the flow chart of FIG. 12. The offset B is computed from the ratio between the reference shutter speed of 1/100 and the shutter speed S1 to be set. The CPU 17 thus first computes the ratio (step S400). Here, ESHUT100 is the exposure time (i.e., number of HDS) corresponding to the shutter speed of 1/100. The computation is executed by using the shutter speed S1, because only the shutter speeds up to S1 are reflected on the evaluation value used for the present AE process. After obtaining the ratio, the CPU 17 computes the offset B from the ratio (step S401). Here, N is the gain setting value corresponding to double the brightness as a change therein.

As shown above, even when a time lag is present between the timing of setting the gain and shutter speed and the timing of reflection of the set gain and shutter speed on the evaluation value, it is possible to realize exposure limitation free from hunting through the above process.

Figure 13:
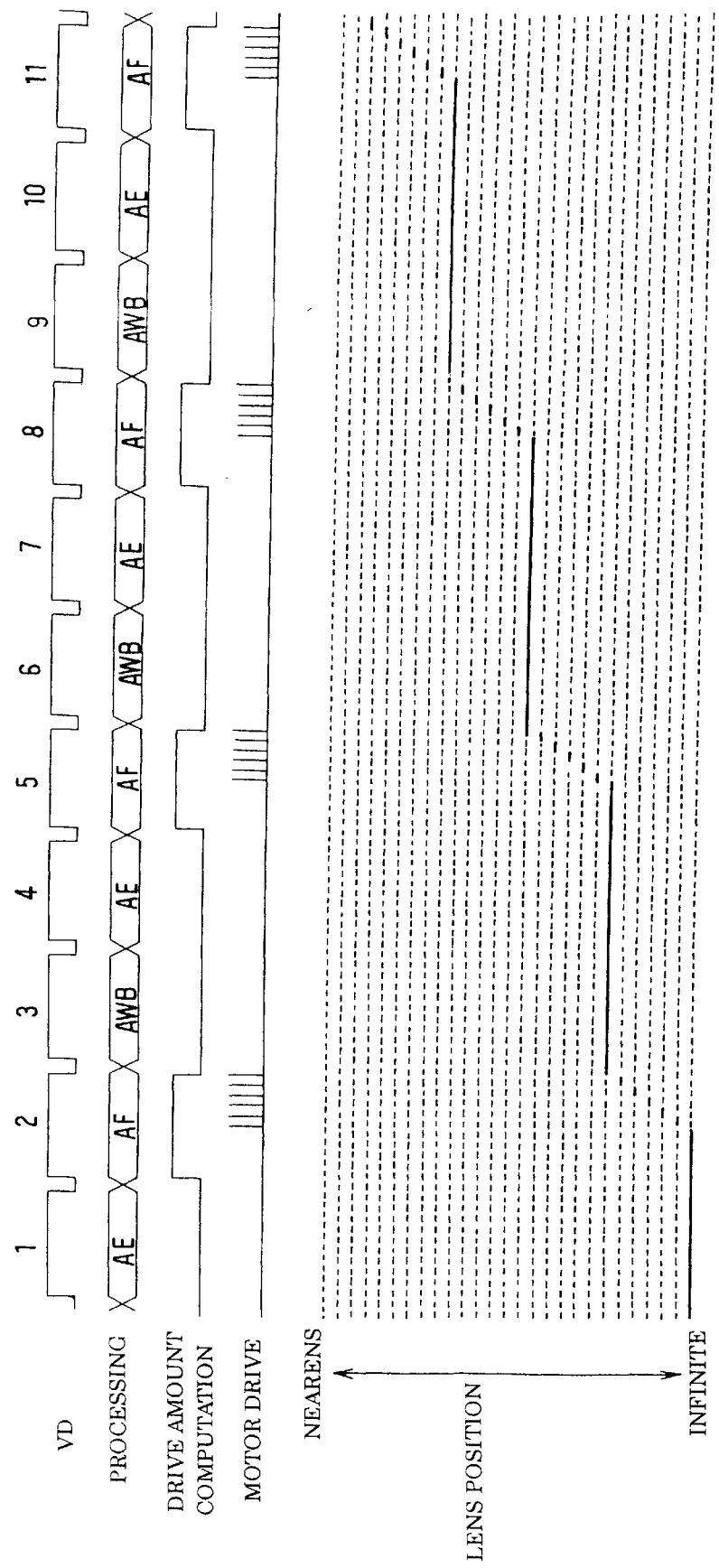
FIG. 13 is a timing chart for describing the operation of driving the focus lens once in three frames in the electronic camera shown in FIG. 3.

A third embodiment of the control status will now be described, in which smooth auto focusing (AF) can be realized by driving the focusing lens for every frame without obtaining the evaluation value for every frame. To facilitate the understanding, a prior art control state in which the focusing lens is driven only once in three frames, will first be described as contrast control status with reference to the timing chart of FIG. 13. Where the circuit scale reduction is attempted, the CPU 17 can take only either one of the three, i.e., AE, AF and AWB, evaluation values in one VD cycle. In such a case, for fast matching of the three, i.e., AE, AF and AWB, controls, the AE, AF and AWB processes are preferably executed sequentially in three frames in synchronism to VD (vertical sync signal) of the image signal. Particularly, where the frame rate is 60, 30 or 15 Hz, this method is particularly convenient for it also provides flicker cancellation effect. However, with the 3-frame cycle for the AE, AF and AWB processes as a whole, the AF process is executed only once in three frames. In the pertinent frame, the CPU 17 should compute the extent of focusing lens driving and cause actual driving of the lens 1 via the motor 23. In the prior art example shown in FIG. 13, the 2-nd VD cycle is allotted to the AF process, and in this period the CPU 17 obtains the AF evaluation value and cause motor driving. In the subsequent 5-th VD cycle, which is again allotted to the AF process, the CPU 17 again computes the focusing lens driving extent and causes driving of the lens 1 via the motor 23. With the driving the motor 23 only once in three frames in this way, an image during the motor driving appears once in every three frames. In this case, if the frame rate is very low, the periods during which the motor is driven and not, are clearly distinguished from each other, that is, the AF control is deemed to be very awkward.

Figure 14:
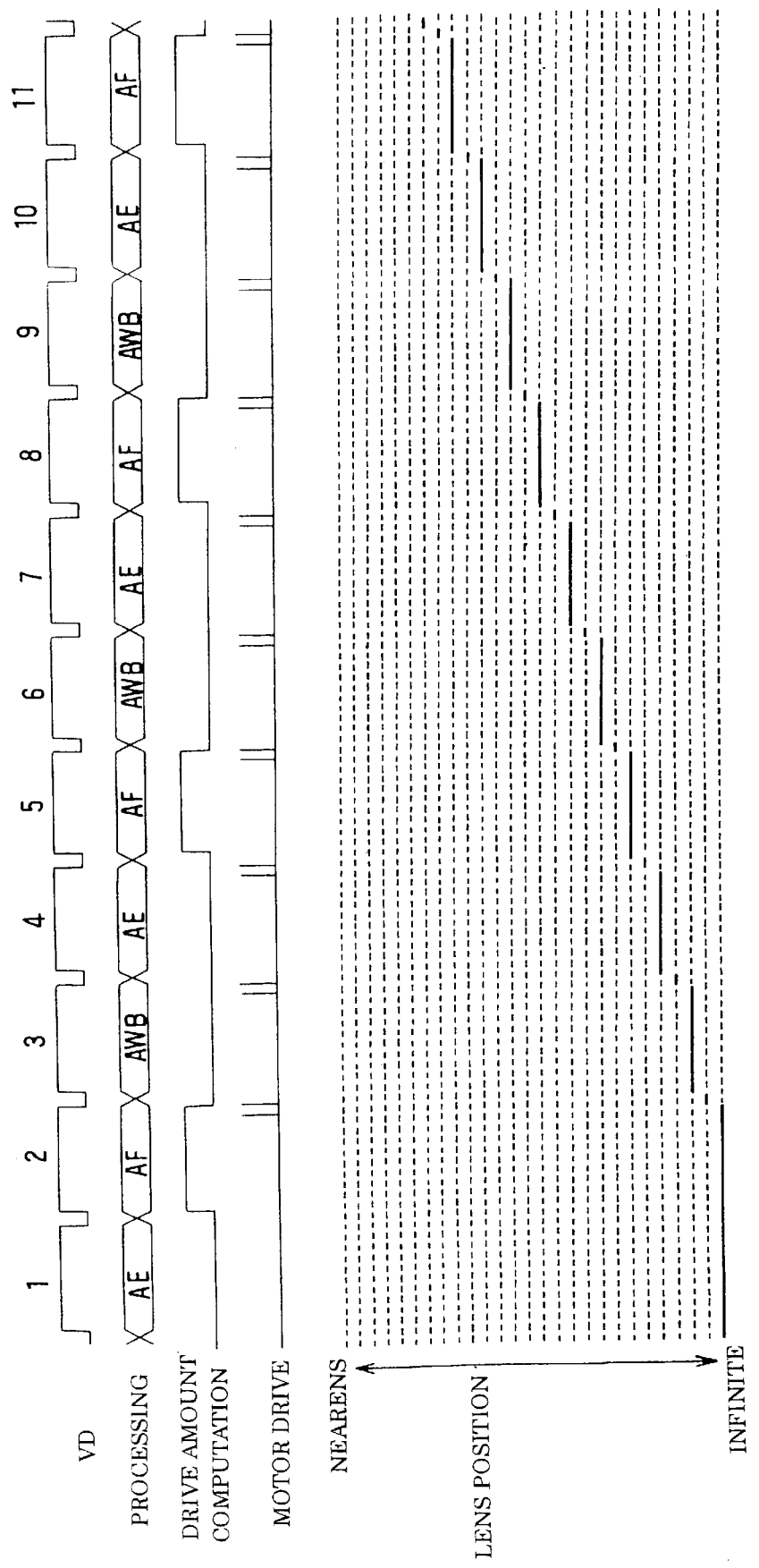
FIG. 14 is a timing chart for describing the operation of driving the focus lens for each frame according to a third embodiment of the present invention in the electronic camera shown in FIG. 3.

To overcome the above drawback in the prior art AF control where the motor 23 is driven only once in three frames, in the present embodiment of the control status the motor is driven for every frame, and it will now be described with reference to the timing chart of FIG. 14. In this instance, the CPU 17 executes the AE, AF and AWB processes sequentially in synchronism to VD. In the 2-nd VD cycle, which is allotted to the AF process, the CPU 17 computes the focusing lens driving extent from the AF evaluation value. Assuming the extent of driving of the motor 23 up to the next AF process (i.e., 5-th VD cycle) by AFSP, in the 2-nd VD cycle the CPU 17 drives the lens 23 by AFSP/3. In the 3-rd and 4-th VD cycles, which are also not allotted to the AF process, the CPU 17 drives the lens 23 by AFSP/3. Likewise, in the 5-th VD cycle allotted to the AF process, the CPU 17 again computes the extent AFSP of lens driving up to the next AF process (i.e., 8-th V cycle), and in the 5-th 7-th VD cycles it drive the lens 23 by AFSP/3. The movie operation executed in the 3-frame cycle has been described earlier in connection with the flow chart of FIG.

9. By causing the motor driving for every frame although the focusing lens driving extent is computed only once in three frames, the lens 23 can be driven smoothly, and it is possible to realize AF control which does not result in awkward operation.

Figure 15:
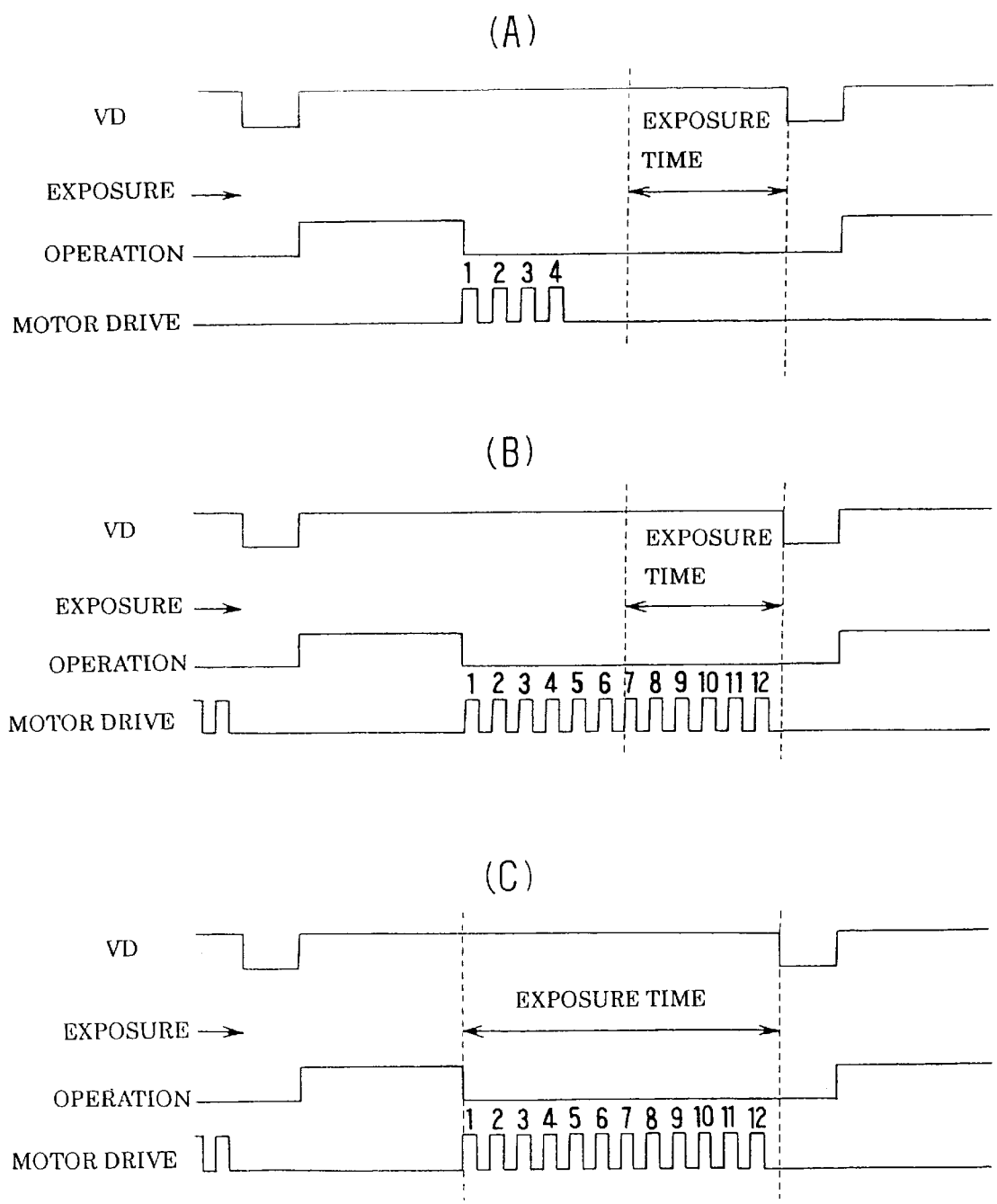
FIGS. 15(A) to 15(C) are timing charts for describing computation of the focus lens position when AF evaluation value is obtained in the electronic camera shown in FIG. 3.

A fourth embodiment of the control status, in which the focus position is computed by using accurate focusing lens position when AF evaluation value is obtained, and which thus can improve the AF accuracy, will now be described with reference to FIGS. 15(A) to 15(C). While FIGS. 15(A to 15(B) illustrate operations in the case of using a stepping motor, the same control can also be executed in the case of using a DC motor. FIG. 15(A) shows the case when the motor driving time and the CCD exposure time do not overlap each other. Since the motor driving time and the CCD exposure time do not overlap, the focus driving extent in the present frame is 4 steps. Thus, the focusing lens position is the position attained up to the preceding frame plus 4.

FIG. 15(B) shows the case when the motor driving time and the CCD exposure time partly overlap each other. In this case, the extent of the focus driving in the present frame is 12 steps. Since it may be thought that the control step position in that part of the motor driving time which overlaps the exposure time represents the lens position during the exposure, (part overlapping the exposure time)+(part not overlapping the exposure time)/2=9 is the lens position obtained by integration from the preceding frame. Thus, the focusing lens position is the position attained up to the preceding frame plus 9. AF control, in which an intermediate step position during driving in the exposure time is the lens position as noted above, is detailed in Japanese Patent Laid-Open Publication No. 9-200597.

FIG. 15(C) shows the case when the motor driving time and the CCD exposure time perfectly overlap each other. Since the focus diving extent in the present frame is intrinsically 12 steps, it may be thought that the central step position represents the lens position during the exposure. Thus, (part overlapping the exposure time)/2=6 is the lens position obtained by driving up to the preceding frame. The above computations in the cases of FIGS. 15(B) and 15(C) are made for the following reasons. In the case of FIG. 15(C), in which the stepping motor is moved from position 0 to position 12 and all the steps overlap the exposure time, the obtained data is accurately that during motion of the motor from position 0 to position 12. In this case, the AF process is executed by assuming this data to be substantially equivalent to one obtained when the motor is held at step position 6.

In the case of FIG. 15(B), in which the stepping motion of the motor partly (from position 7 to position 12) overlaps the exposure time, the obtained data is accurately that during motion of the motor from position 7 to position 12. In this case, the AF process is executed by assuming the data to be substantially equivalent to one obtained when the motor is held at position 9.

These computations have an effect that it is possible with simple computations to make up for error in the AF control with lens driving. In the AF control of the commonly termed mountain-climbing system, AF evaluation value and data of the focusing lens position when that evaluation value is obtained, are necessary for each AF process execution frame. The above focusing lens position computation method permits focus accuracy improvement compared to the method, in which the lens position is obtained from the sole lens driving extent.

Figure 16:
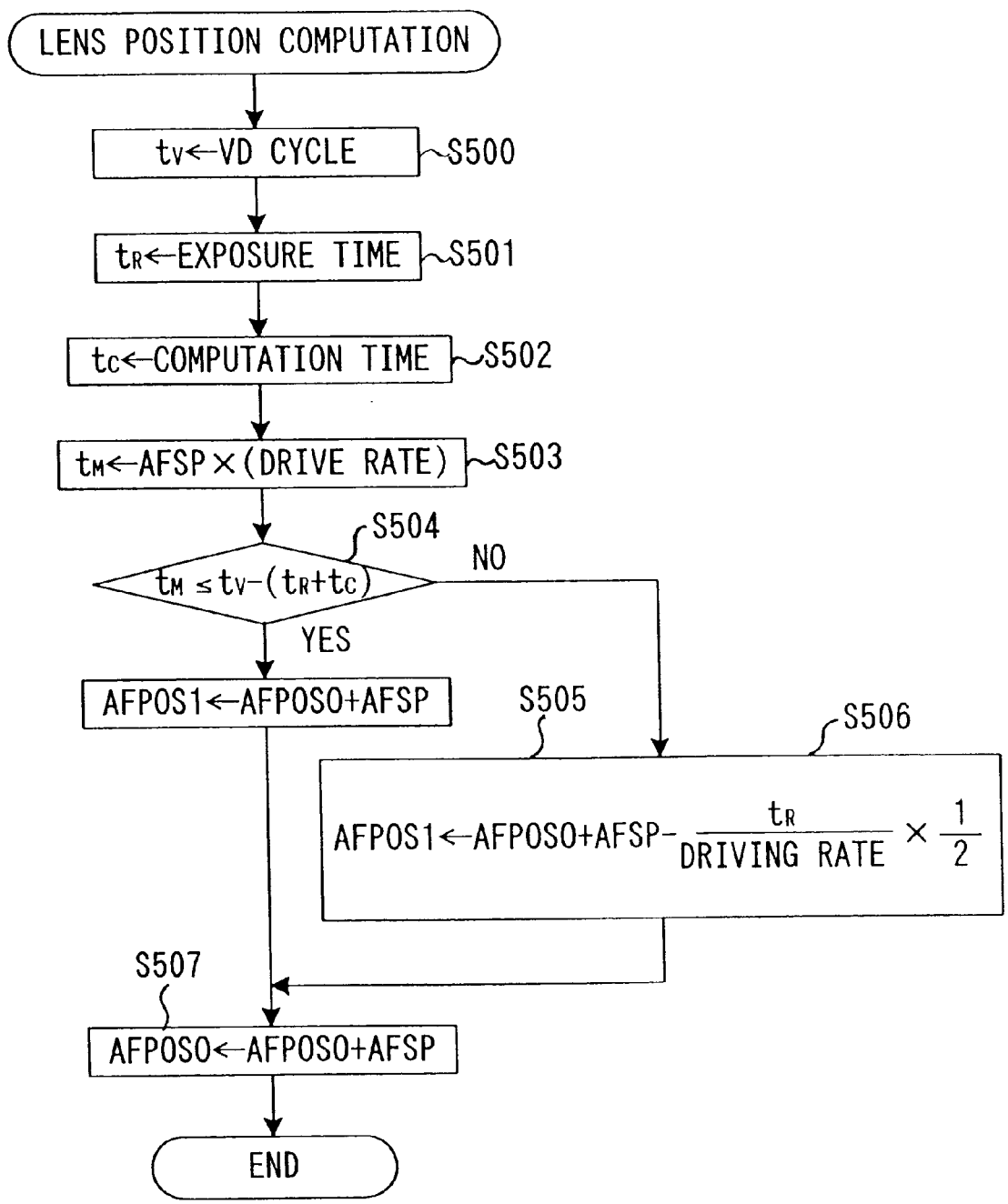
FIG. 16 is a flow chart for describing the lens position computation process in the AF processing step in FIG. 9.

The lens position computation process will now be described with reference to the flow chart of FIG. 16. The lens position computation process is called in the AF process step (S112) shown in the flow chart of FIG. 9. The CPU 17 first reads out necessary data. Specifically, the CPU 17 first reads out the VD cycle time $t_V$ (in ms) (step S500), and then reads out the exposure time $t_R$ (in ms) (step S501). The CPU 17 converts in advance the shutter speeds stored in it in terms of exposure times (i.e., numbers of HDs) to times (in ms). It is assumed that the intervals of the VD cycle and exposure time are unchanged during AF. Even when these intervals are changed, the present process may be executed. In this case, however, it is necessary to store the VD cycle and exposure time in the frame preceding by two frames. This is executed so because the evaluation value is provided two frames after the exposure as described before. The CPU 17 subsequently reads out computation time $t_C$ (step S502). This computation time is again one which was stored in the frame preceding by two frames. If it is impossible to measure the computation time, the worst value may be stored as fixed value. The CPU 17 subsequently computes motor driving time $t_M$ from the one-frame feed amount AFSP and driving rate (in ms) (step S503). The AFSP and driving rate are again those which were stored in the frame preceding two frames. For the value of AFSP, the driving extent determination process in the AF process is controlled such that the sum of the motor driving time $t_M$ and computation time $t_C$ will not exceed one VD cycle time $t_V$ ($t_M + t_C \leq t_V$).

When the CUP 17 has read out the necessary data, it checks whether the exposure time and the motor driving time overlap each other (step S504). When it is not determined that the two times overlap, the CPU 17 computes focusing lens position AFPOS1 (step S505). AFPOS0 is the lens position driven up to the frame preceding by three frames. The computed AFPOS1 is the focusing lens position when the evaluation value is obtained. When it is determined that the two times overlap, the CPU 17 computes the focusing lens position AFPOS1 (step S506). Finally, the CPU 17 computes AFPOS0 necessary for the next routine, thus bringing an end to the present routine. The focusing lens position AFPOS1 necessary for the next routine is not the lens position (AFPOS1) when the evaluation value is obtained but the position actually attained by the lens, so that it is computed by adding AFSP to AFPOS0.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An electronic camera comprising an image pick-up device, means for setting the photoelectric charge accumulation time of the image pick-up device, an image pick-up circuit for including gain control means, for processing a signal read out from the image pick-up device to obtain an image signal, and control signal processing means for obtaining a focus control signal, an exposure control signal and a white balance control signal from the image signal and selectively controlling individual signal processes, wherein in the control signal processing means,
one signal is obtained among the focus control signal, exposure control signal, white balance control signal based on the image signal in a first photographing cycle and processed to obtain a desired control value of the first control signal;

another signal other than the signal obtained in the first photographing cycle is obtained among the focus control signal, exposure control signal, white balance control signal based on the image signal in a second photographing cycle succeeding to the first photographing cycle and processed to obtain a desired control value of the second control signal, the above processes being executed repeatedly; and the desired control value is changed such that differential values between the desired control values of the same control signal as that obtained in the proceeding process are equally distributed over a plurality of photographing cycles existing in timings in which the desired control value is obtained and set.

2. The electronic camera according to claim 1, wherein the means for setting the photoelectric charge accumulation time of the image pick-up device can set the photoelectric charge accumulation time discretely so that the photoelectric charge accumulation time can be changed to values free from flicker, and sets the photoelectric charge accumulation time variably in combination with gain control by gain control means.

3. The electronic image pick-up means according to claim 1, wherein the means for setting the photoelectric charge accumulation time of the image pick-up device sets the level of the image signal with combination of the setting of the photoelectric charge accumulation time and gain control by gain control means, and the gain of image signal based on photoelectric charge accumulated after control of the photoelectric charge accumulation time of the image pick-up device is controlled after one vertical sync cycle.

4. The electronic camera according to one of claim 1, which further comprises photographing lens focus driving means driven for every frame.

5. The electronic camera according to claim 1, wherein gain control by gain control means and control of the photoelectric charge accumulation time of the image pick-up device are controlled by increasing or reducing them in predetermined ratios.

6. The electronic camera according to claim 1, wherein the control signal processing means makes preparations for a signal process on a control signal to be provided by signal processing one vertical sync cycle afterwards while executing a signal process on a pertinent one of the control signals.

7. The electronic camera according to claim 1, wherein the control signal processing means first executes the signal process on the exposure control signal and then executes the signal processes on the focus control signal and the white balance control signal.

8. The electronic camera according to claim 1, wherein the means for setting the photoelectric charge accumulation time of the image pick-up device sets the time of switching of the photoelectric charge accumulation time for each frame to an integral multiple of 1/100.

9. An electronic camera comprising an image pick-up device, means for setting the photoelectric charge accumulation time of the image pick-up device, an image pick-up circuit for including gain control means, for processing a signal read out from the image pick-up device to obtain an image signal, control signal processing means for obtaining a focus control signal, an exposure control signal and a white balance control signal from the image signal and selectively controlling individual signal processes, wherein in the control signal processing means, one signal is obtained among the focus control signal, exposure control signal, white balance control signal based on the image signal in a first photographing cycle and processed to obtain a desired control value of the first control signal;

another signal other than the signal obtained in the first photographing cycle is obtained among the focus control signal, exposure control signal, white balance control signal based on the image signal in a second photographing cycle succeeding to the first photographing cycle and processed to obtain a desired control value of the second control signal, the above processes being executed repeatedly; and the desired control value is changed such that differential values between the desired control values of the same control signal as that obtained in the proceeding process are equally distributed over a plurality of photographing cycles existing in timings in which the desired control value is obtained and set, the camera further comprising photographing lens focus driving means driven for every frame, and the summation of the time necessary for the driving of the photographing lens by the photographing lens focus driving means and the computation time of the signal process on the focus control signal from the control signal processing means does not exceed one vertical sync cycle time.

* * * * *